Dec. 12, 1967  J. W. HENDRY  3,357,042
SMALL AREA ROTATING CONE PLASTICIZER
Filed May 28, 1965  3 Sheets-Sheet 1
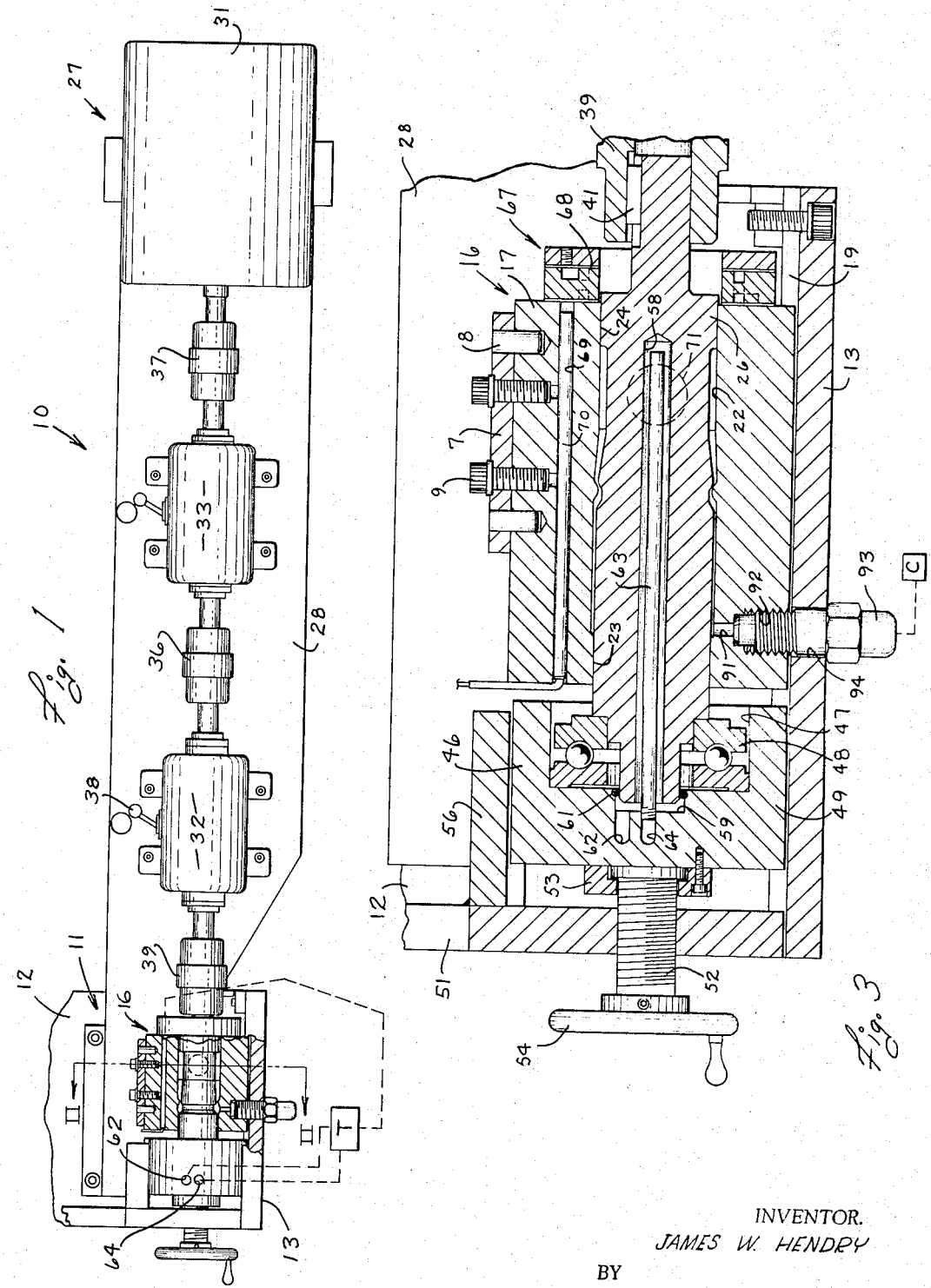
INVENTOR.
JAMES W. HENDRY
BY
Woodhams, Blanchard and Flynn
ATTORNEYS

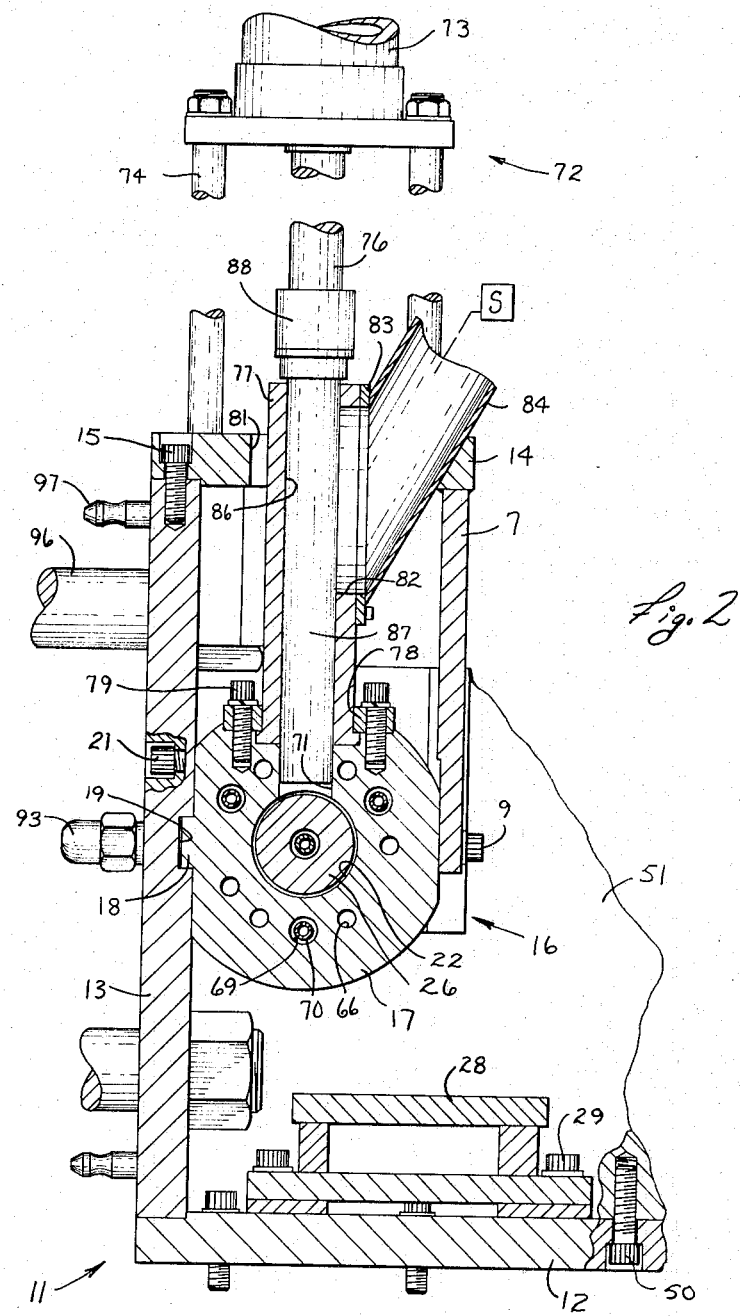

Dec. 12, 1967  J. W. HENDRY  3,357,042
SMALL AREA ROTATING CONE PLASTICIZER
Filed May 28, 1965  3 Sheets-Sheet 2
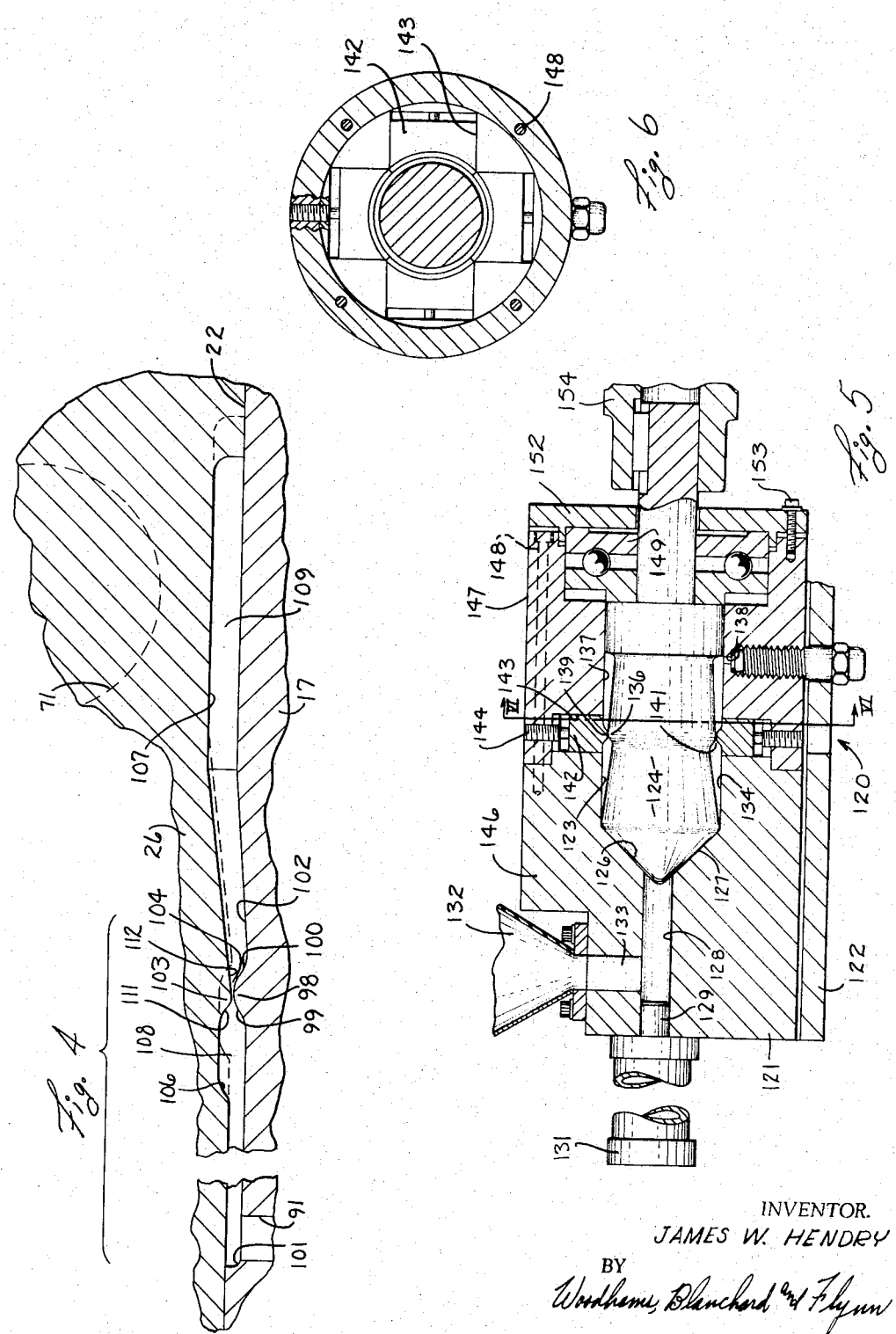
INVENTOR.
JAMES W. HENDRY
BY
Woodhams, Blanchard and Flynn
ATTORNEYS

United States Patent Office 3,357,042
Patented Dec. 12, 1967

3,357,042
SMALL AREA ROTATING CONE PLASTICIZER
James W. Hendry, Scottsburg, Ind., assignor to Borg-Warner Corporation, Chicago, Ill., a corporation of Illinois
Filed May 28, 1965, Ser. No. 459,673
10 Claims. (Cl. 18—2)

ABSTRACT OF THE DISCLOSURE

A plasticizing machine including a housing having a chamber extending axially therethrough and further having a rotatably driven shaft extending into the chamber to define with the wall of said chamber an annular plasticizing zone. The chamber wall and the shaft each include an annular radially extending raised portion positioned substantially opposite each other so as to define a gap of adjustable thickness therebetween. The portions of said annular plasticizing zone on either side of said gap provide passageways for allowing plastic material to be fed through the gap, the plastic material being frictionally worked and plasticized by the opposed and relatively rotating raised portions as it passes therethrough.

---

This invention relates to a plasticizing machine and, more particularly, relates to a plastic working machine having a relatively rotating pair of annular raised portions disposed for frictionally working plastic materials forced therebetween.

The present invention is a result of a continuing effort to improve the form and performance of plasticizing and compounding machines of the general type disclosed in my copending application Ser. No. 368,085, filed May 18, 1964 and now abandoned. Said copending application sets forth a plasticizing machine including a spindle, one end of which is tapered substantially from axis to periphery to form a cone rotatably disposed in a cylindrical opening in the machine housing. The end of the opening adjacent the conical shaft end forms a conical seat which interacts with the shaft cone to frictionally work or mull plastic material forced therebetween. Although the device of the aforementioned copending application has so far proven itself quite acceptable, it is believed that as larger machines are constructed, the concurrent increase in the size of the already relatively large area mulling surfaces of the aforementioned prior machine would greatly increase the opportunity for pieces of softened plastic material to adhere to the mulling surfaces and become overheated. Temperature or heating time sensitive materials might undergo charring or other deterioration under such circumstances with the result that charred particles might eventually appear in the finished plastic product and make it unacceptable.

In addition, a mulling surface which extends from the shaft periphery substantially to the center of the shaft must be located at the end of the shaft since little or no room is left in the center of the shaft for an extension beyond the mulling surface. Thus, it may become difficult to properly fill all of the needs of the mulling head, that is, to adequately support the mulling head against radial and axial thrust loads through the proper size and disposition of the bearings, to provide cooling or other temperature control within the shaft adjacent the mulling head and to provide associated mechanisms for rotating and, in some cases, for axially adjusting the shaft with respect to the housing. It will be apparent that provision for all these needs is generally substantially more difficult when only one end of the shaft is available therefor and the other end must be left free for supporting the mulling surface.

Hence, the objects of this invention include:

(1) To provide a plastic working machine having a relatively rotating pair of annular raised portions disposed for frictionally working plastic material forced therebetween.

(2) To provide a machine, as aforesaid, capable of frictionally working or mulling material forced past the raised portions thereof for plasticizing same and capable of frictionally working several different materials simultaneously forced therebetween, mixing such materials and at least partially plasticizing the resulting mixture.

(3) To provide a machine, as aforesaid, in which one of the raised portions is disposed on the periphery of a rotating shaft and the other raised portion extends inwardly from the wall of the chamber within which the shaft is rotatably disposed and in which the raised portions radially clear each other to prevent direct contact therebetween and frictional damage thereto, to allow relative axial movement thereof past each other and to permit removal of the shaft from the chamber in either axial direction.

(4) To provide a machine, as aforesaid, in which the raised portions are each defined by sloped ramp surfaces extending axially therefrom, in which said ramp surfaces are relatively short and sharply sloped with respect to the axis of the shaft and in which the effective thickness of the gap between the raised portions as well as the length thereof can be varied through a relatively wide range with only a relatively short axial adjustment of the shaft with respect to the chamber.

(5) To provide a machine, as aforesaid, in which the radial extents of the raised portions are similar in magnitude and are relatively small compared to the maximum radius of the shaft or chamber, in which the difference in the peripheral velocities of the raised portions is substantially constant throughout the length of the gap therebetween and in which the average peripheral velocity difference between the raised portions closely approaches the maximum obtainable for the shaft radius and rotational speed between the shaft and chamber.

(6) To provide a machine, as aforesaid, in which annular passages of thickness greater than the gap are provided on either side of the gap to allow material to approach and leave said gap.

(7) To provide a machine, as aforesaid, in which said raised portions are provided intermediate the ends of the rotating shaft, in which both ends of the rotating member are left free for installation of bearings, coolant connections, rotative power sources and/or axial adjustment mechanisms as desired and in which great rigidity in the support of the shaft can be obtained.

(8) To provide a machine, as aforesaid, which allows for a wide variety in the form of the gap including variations in gap shape, inclination of the ramp surfaces with respect to the axis of the rotating member and minimum and maximum gap thickness limits and which allows the use of relatively small and inexpensively machined replaceable inserts for carrying the raised portions.

(9) To provide a machine, as aforesaid, in which the speed of rotation of the shaft is independent of the rate at which material is forced into the gap.

(10) To provide a machine, as aforesaid, in which the shaft is capable of carrying, in tandem with the raised portions defining the gap, further material working means such as a mulling cone and in which the use of tandem material working elements allows for compounding and plasticizing of plasticizable mixtures in one continuous operation in a single machine.

(11) To provide a machine, as aforesaid, in which the output flow rate, input feed rate and extent of plasticizing may be made similar to a conventional mulling cone of the type disclosed in my above-mentioned copending application having the same outer radius at only slightly higher shaft speeds.

(12) To provide a machine, as aforesaid, in which the input force required for given material flow rate may be less than in conventional large area conical mulling heads.

(13) To provide a machine, as aforesaid, in which the rotational speed of the shaft is relatively high and in which the length of the gap and area of the opposed ramp surfaces are relatively small to minimize any tendency for material being worked to adhere to such surfaces and become overheated.

(14) To provide a machine, as aforesaid, in which the axial thrust load on the shaft due to material pressure on the ramp or mulling surfaces thereof is substantially less than on conventional large area mulling cones as a result of material pressure acting on the axially opposed surface of the material inlet passage and in which thrust bearings of only relatively small capacity are generally required.

(15) To provide a machine, as aforesaid, which is relatively inexpensive to construct and maintain, which is substantially self-cleaning in operation for allowing long continuous periods of running without stoppage for cleaning and which allows changes of input material while running with a minimum of carryover of the old material into the new.

Other objects and purposes of this invention will be apparent to persons acquainted with apparatus of this general type upon reading the following specification and inspecting the accompanying drawings.

In the drawings:

FIGURE 1 is a partially broken top elevational view of the machine embodying the invention.

FIGURE 2 is an enlarged, partially broken fragmentary sectional view taken on the line II—II of FIGURE 1 and rotated through 90 degrees in a clockwise direction.

FIGURE 3 is an enlarged fragment of FIGURE 1 showing the shaft in a different operative position.

FIGURE 4 is an enlarged fragment of FIGURE 1 showing the mulling surfaces in detail.

FIGURE 5 is a fragmentary central cross-sectional view corresponding generally to FIGURE 3 and showing a modified machine.

FIGURE 6 is a partially broken sectional view taken on the line VI—VI of FIGURE 5.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal direction of material flow through the device and to the opposite direction, such directions being leftwardly and rightwardly, respectively, as seen in FIGURE 3. The words "inwardly" and "outwardly" will refer to directions toward and away from the geometric center of the device and designated parts thereof. Such terminology will include the words above specifically mentioned, derivatives thereof and words of similar import.

General description

In general, the objects and purposes of this invention are met by providing a machine for frictionally working plastic material, said machine including a housing having a chamber extending axially therethrough and a shaft extending into the chamber. Drive means are provided for rotatably driving one of the shaft and housing, preferably the shaft, with respect to the other and for supporting the shaft within the chamber against radial and axial thrust loads. The housing and shaft each include an annular raised portion, the radial thickness of which is small compared to the maximum radius thereof. The raised portions radially clear each other. The raised portions define a gap of adjustable thickness therebetween. Annular passages are provided on either side of the gap for allowing plastic material to be fed through the gap so as to be frictionally worked by the opposed and relatively rotating raised portions. The inlet passage is fed material to be worked under pressure.

Detailed description

The plastic working machine 10 (FIGURES 1, 2, 3, and 4) embodying a preferred form of the invention includes a support frame 11. The frame 11 includes a table 12 at one (leftward as seen in FIGURE 2) side of which is affixed by any convenient means, not shown, an upstanding wall 13. A shelf 14 (FIGURE 2) is affixed to the top of the wall 13 by any convenient means such as screws 15 and extends partially over the table 12.

The wall 13 carries a plastic working unit generally indicated at 16. In the present embodiment, the unit 16 includes a substantially cylindrical housing 17. The side of the housing 17 adjacent the wall 13 is flattened for snug contact therewith and is provided with an axially extending rectangular pilot boss 18. A rectangular groove 19 is provided in a wall 13 in parallelism with the table 12 for snugly receiving the pilot boss 18 and, hence, for locating the housing 17 with respect to the table 12. Screws, one of which is shown at 21, secure the housing 17 to the wall 13. A depending support plate 7 is secured, preferably by welding, to the underside of the shelf 14 for snugly contacting the rightward (FIGURE 2) side of the housing 17. The plate 7 is preferably secured to the housing 17 by locating pins 8 and screws 9 for providing additional support for said housing 17.

The housing 17 has a central opening or chamber 22 (FIGURE 3) therethrough and is circular in cross section. The central opening 22 is provided with cylindrical end portions 23 and 24. A shaft 26 is slidably disposed in the central opening 22 and is radially supported for rotation therewithin by the cylindrical end portions 23 and 24.

The shaft 26 is rotatably driven by a drive unit generally indicated at 27 (FIGURE 1). The drive unit 27 is supported on a platform 28 (FIGURES 1 and 2) affixed to the table 12 below the plastic working unit 17 by any convenient means such as screws 29. The platform 28 extends axially of said shaft away from the table 12 (toward the right in FIGURE 1). The drive unit includes a rotative prime mover 31, preferably an electric motor, which is carried by the platform 28 and is axially aligned with the shaft 26. The motor 31 connects to the shaft 26 through a variable speed drive comprising in the particular embodiment shown a tandem pair of transmissions 32 and 33. Couplings 36 and 37 connect the corresponding shafts of the transmissions 32 and 33 and motor 31. The transmissions 32 and 33 are each equipped with handles 38 actuable to shift the transmissions to different speed ratios. In the particular embodiment shown, the transmissions 32 and 33 are each shiftable through four ratios giving a total of 16 different speed ratios and are capable of driving the shaft 26 at speeds covering at least a range of 25 to 1000 r.p.m. The output shaft of the transmission 32 is provided by coupling 39 which axially slidably connects to the rightward (FIGURE 3) end of the shaft 26 for rotatably driving same through a key 41. Thus, the drive unit 27 is capable of rotatably driving the shaft 26 while allowing axial adjustment thereof with respect to the housing 17.

A cup-shaped bearing support 46 is provided in the present embodiment at the leftward (FIGURE 3) end of the shaft 26. The support 46 has a rightwardly opening central recess 47 within which is disposed an axial thrust bearing 48 for limiting the leftward movement of the shaft 26. The bearing support 46 may be supported in any convenient manner for adjustment toward and away from the housing 17. In the particular embodiment shown, the bearing support 46 is provided with a pilot boss 49 similar to the boss 18 of the housing 17 which is snugly but slideably received within the groove 19 of the wall 13.

A bracket plate 51 is spaced in front of the bearing support 46 and is fixed by any convenient means such as screws 50 (FIGURE 2) to the table 12 and wall 13. An adjustment screw 52 coaxial with the shaft 26 is threaded through the bracket plate 51. The rightward end of the screw 52 is rotatably secured to the forward end of the bearing support 46 by a suitable fastening plate 53. The leftward end of the screw 52 is provided with manually actuable wheel 54 for rotating the screw 52 and, hence, moving the bearing support 46 and shaft 26 axially with respect to the housing 17. To provide additional support for the bearing support 46, a grooved plate 56 is fixed as by welding to the bracket plate 51 and extends rearwardly therefrom along the side of the bearing support 46 parallel to the wall 13.

The shaft 26 is provided with temperature controlling means including a central passage 58 which opens through the leftward end thereof. The leftward end of the shaft 26 is of reduced diameter and is received within a well 59 in the forward face of the recess 47 in the bearing support 46. An O-ring or similar seal 61 is radially disposed between the leftward end of the shaft 26 and the well 59 to prevent leakage of fluid from the well along the shaft. A passage 62 communicates with the edge of the well 59 and extends radially therefrom through the periphery of the bearing support 46. The passage 62 preferably connects by a conduit schematically indicated by a broken line in FIGURE 1 to the low pressure side of a conventional source of temperature controlling fluid schematically indicated at T. A conduit 63 threadedly engages the radial face of the well 59 and extends rearwardly and coaxially into the central passage 58 to a point close to but spaced from a rearward end thereof. A passage 64 communicates with the forward end of the conduit 63 and extends radially through the periphery of the bearing support 46. The passage 64 is connected, as indicated by the broken line in FIGURE 1, to the source T preferably at the outlet side thereof.

The housing 17 (FIGURE 2) is provided with a plurality of temperature control passages 66 which extend axially thereinto from the rearward end thereof. An annular header 67 (FIGURE 3) is affixed to the rearward end of the housing 17. The header 67 is provided with suitable passages 68 which communicate with the rearward ends of the passages 66 for supplying same with temperature controlling fluid from the source T. Such fluid may be returned to the source T by any convenient means not shown. Several, here three, of further passages 69 are circumferentially arranged among the temperature control passages 66 for receiving suitable thermal sensors 70, preferably electrical, such as thermistors or thermocouples.

The housing 17 is provided with an inlet opening 71 (FIGURE 2) the location of which is indicated by the broken line in FIGURES 1 and 3. A feeding unit generally indicated at 72 in FIGURE 2 is in communication with the inlet opening 71 and extends upwardly therefrom for feeding plastic material to be worked into said inlet opening. The feeding unit 72 includes a pressure fluid cylinder 73 axially aligned with the opening 71 and spaced above the shelf 14 by a plurality of upstanding rods 74. The reciprocable piston rod 76 of the pressure fluid cylinder 73 extends downwardly therefrom toward the shelf 14. A hollow ram guide 77 is affixed at its lower end to the upper surface of the housing 17 by means of a collar 78 and screws 79. The guide 77 extends coaxially upwardly from the inlet opening 71 through an opening 81 in the shelf 14. An aperture 82 is provided in the side of the ram guide 77 adjacent the upper end thereof. The mounting flange 83 of an inlet conduit 84 is secured to the side of the ram guide 77 so that the inlet conduit 84 communicates through the aperture 82 with the central opening 86 of the ram guide 77. The inlet conduit 84 connects to any convenient material source schematically indicated at S and which may be a hopper or the like. The source S is capable of supplying material in fluent form, preferably in the form of granules, to the central opening 86 of the ram guide 77. A vertically elongated ram 87 is snugly but slideably disposed within the central opening 86. The upper end of the ram 87 is fixed by a coupling 88 to the lower end of the piston rod 76. The cylinder 73 is capable of moving the ram 87 within the ram guide 77 between a location above the opening 82 and a location closely adjacent the shaft 26. The openings 86 and 71 are preferably the same diameter to allow the lower end of the ram 87 to closely approach the shaft 26.

The housing 17 is provided with a radial outlet opening 91 (FIGURE 3) which is spaced forwardly from the inlet opening 71 and in this particular embodiment is angularly displaced about the axis of the opening 22 through 90 degrees therefrom and extends toward the wall 13. The outer portion of the outlet opening 91 is preferably threaded as indicated at 92 for receiving any convenient connection means, here a nozzle 93, whereby the outlet opening 91 may be connected to a suitable material-consuming device schematically indicated at C which may comprise, for example, an extrusion die, injection mold, accumulator or further material-working means of any convenient type. In the particular embodiment shown the nozzle 93 extends through an opening 91 in the wall 13 for feeding a mold, not shown. The wall 13 includes in the present embodiment threaded rods 96 and locator pins 97 for supporting a suitable consuming device C such as the platen of a mold.

Referring to FIGURE 4, the central opening 22 is provided with an annular ridge or raised portion 98 having sloped and axially extending annular ramp surfaces 99 and 100. The ridge 98 is located between the inlet and outlet openings 71 and 91 and preferably adjacent the outlet opening 91. The apex of the ridge 98 is preferably rounded. In the particular embodiment shown, the apex of the ridge 98 is curved about a radius of approximately 0.25 inch, the ridge 98 is about 0.19 inch in radial height and the inside diameter of the central opening 22 at said ridge is about 4 inches. Thus, the radial height of the ridge is about 5 percent of its inside diameter. The ridge 98 preferably does not extend radially inwardly beyond the cylindrical end portions 23 and 24 of the central opening 22 and separates a pair of annular grooves 101 and 102. The ramp surfaces 99 and 100 of the ridge 98 are preferably smoothly curved into the surface of the grooves and the ridge 98 is preferably without sharp edges which might catch material being forced therepast.

The shaft 26 is provided with an annular ridge or raised portion 103 which by axial adjustment of the shaft 26 is capable of moving past the ridge 98. More particularly, in the present embodiment of the invention, the ridge 103 is capable of moving with the shaft 26 from a point directly radially opposite ridge 98 as indicated by the solid line at FIGURE 4 to a position rearwardly spaced therefrom as indicated by the broken line in FIGURE 4. The ridge 103 radially clears the ridge 98 and said ridges when radially opposed are in the present embodiment spaced by a gap 104 of approximately 0.060 inch. In the present embodiment of the invention, the bearing portions 23 and 24 of the opening 22 are of substantially the same diameter. The radii of ridges 98 and 103 are preferably greater than and less than, respectively the radii of the portions 23 and 24 to allow removal of the shaft 26 from the housing 71 in either axial direction. The ridge 103 is substantially similar in radial size to the ridge 98 and includes sloped ramp surfaces 111 and 112. The ridge 103 separates a pair of annular grooves 106 and 107 on the shaft 26. The grooves 101 and 106 define an annular outlet passage generally indicated at 108 which extends from the gap 104 forwardly just past the outlet opening 91. Similarly, the annular grooves 102 and 107 form an annular inlet passage 109 which extends from the gap 104 rearwardly just past the inlet opening 71. The ridge 103 is preferably at least somewhat rounded at its apex and the ramp surfaces 111 and 112 are faired smoothly into the bottoms of the grooves 106 and 107. Sharp projections which might tend to trap material being forced therepast are avoided.

In the particular embodiment shown, the forward ramp surface 111 is sloped at substantially the same inclination as the sides of the ridge 98 whereas the rearward ramp surface 112 is substantially longer and slopes more gradually with respect to the axis of the shaft 26. The groove 102 of the present embodiment extends rearwardly only about as far as does the rearward ramp surface 112 of the ridge 103 when the ridge 103 is radially opposed to the ridge 98. The bottom of the groove 102 and the ramp surface 112 diverge rearwardly at a small angle.

Thus, the passage 109 is of relatively large radial thickness (in the particular embodiment shown, somewhat under 0.50 inch) adjacent the inlet opening 71 and gradually decreases in radial thickness as a gap 104 is approached. Comparison of the solid and broken-line positions of the shaft 26 in FIGURE 4 reveals that the gap 104 is substantially axially longer and radially thicker with the shaft 26 in its broken-line rearward position than with the shaft in its solid-line or forwardmost position. Thus, depending on the physical characteristics of the materials to be combined or plasticized, the shaft 26 may be axially adjusted to provide a relatively short and thin gap or a relatively long and thick annular gap or any corresponding variation therebetween.

If desired, the diameter of one of the bearing portions 23 and 24 may be made larger than that of the other, the pressure of the material within the annular passages 108 and 109 thereby urging the shaft 26 axially toward the larger bearing portion to positively prevent any tendency of the shaft to oscillate axially, or in other words, to hunt. With the thrust bearing 48 disposed at the forward end of the shaft 26 as in the present embodiment, the above-mentioned material pressure effect would be achieved by making the rearward bearing surface 24 larger in diameter. The thrust bearing may, of course, be replaced or relocated if it is desired that the diameter of the bearing 23 be the larger of the two. In the particular embodiment shown, however, the bearing portions 23 and 24 are of substantially similar diameter, frictional forces of the material moving forwardly through the passages 108 and 109 and gap 104 urging the shaft 26 forwardly against the bearing 48.

*Operation*

Although the operation of the machine 10 embodying the invention has been indicated somewhat hereinabove the same will now be summarized to insure a complete understanding of the invention. Operation of the machine normally begins with adjustment of the shaft 26 axially to produce a gap 104 of the desired size. Assuming the ram 87 to be in its uppermost or rest position and assuming material to be supplied to the central opening 86 from the source S, downward movement of the ram forces material downwardly through the inlet opening 71 and along the annular inlet passage 109 toward the gap 104. The drive unit 27 may be energized either with or before the ram 86 drops. The drive unit 27 rotates the shaft 26 at a preselected constant speed, selected in the present embodiment by shifting the transmissions 32 and 33 or by adjustment of the speed of the motor 31. As the material is moved forwardly along the annular inlet passage 109, the relative rotation of the housing and shaft tends to initiate working of the material to a small degree.

If there should be several different materials present in the passage 109, the relative rotation of the shaft and housing tends to initiate mixing thereof.

If desired, the material may be prewarmed in this area by introducing fluid such as water which has been preheated by the temperature controlling source T into the passages within the housing and shaft. On the other hand the temperature controlling source T may be used to cool fluid introduced to such passages in order that heat generated at the gap as hereinafter described may be carried away. In either case, the fluid circulated through the length of the shaft and housing tend to reduce axial temperature gradients in the shaft and housing.

As material is forced by the ram 87 through the constricted gap 104, frictional working of particles of material is greatly increased and the particles are rapidly heated and plasticized. Again, if several materials are present, the tendency of these materials to mix is greatly increased at this point. In the particular embodiment shown, the rounded apex portions of the ridges 98 and 103 (including in the latter case the forwardmost portion of the ramp 112) are the primary material-working or milling surfaces when the ridges are radially opposed. The gap 104 is defined primarily by the ramps 100 and 111 when the gap is enlarged in the preferred embodiment shown. However, it is contemplated that the shaft 26 be axially adjustable to move the ridge 103 forwardly past the ridge 98 to work material between the ramps 99 and 112 if a gap of nonuniform thickness is desired.

It will be noted that the gap 104 is primarily axially aligned and has only a relatively small radial component, such radial component being particularly small when compared to the total radius of the shaft 26. Thus, the net peripheral speed difference across the gap 104 is substantially the same throughout the length of the gap. As a result, the working of a particular material can be closely and reliably controlled since the machine 10 allows selection of an optimum speed differential across the gap which differential is substantially constant throughout the gap length for assuring the uniform working of the material. The machine 10 is readily adjusted, either while shut down or in operation, to the requirements of a particular material or material mixture by variation of the shaft speed, gap size and the input pressure on the material.

For a given gap thickness and material flow rate through the gap, the machine 10 embodying the invention may achieve the same extent of frictional working as a conventional pointed cone mulling head of the type disclosed in the aforementioned application Ser. No. 368,085 by setting the rotational shaft of the present machine at any rate somewhat higher than that of the conventional mulling cone. The relatively peripheral speed differential across the gap 104 together with the relatively small area of the mulling surfaces is believed to reduce the possibility of material adhering to the mulling surfaces and, hence, becoming overheated and charred.

Material, after passing through the gap 104, is forced into the annular outlet passage 108 and, hence, out the outlet opening 91 to a consuming device C of any desired type such as a mold, extrusion die or accumulator or if the machine is adjusted to only partially work the material, the material may be moved to a further material-working device of the same or different type for further working.

*Modification*

FIGURES 5 and 6 illustrate a modified embodiment of the invention. The machine 120 of FIGURES 5 and 6 differs from the machine 10 of FIGURE 1 primarily in providing a shaft carrying a conical mull of the type disclosed in the above-mentioned application Ser. No. 368,085 in tandem with means defining a mulling gap corresponding to that defined by the ridges 98 and 103 of FIGURE 4.

The machine 120 includes a housing 121 affixed to a suitable carrying wall 122 by any convenient means, not shown. The housing 121 has a central opening 123 for rotatably receiving a shaft 124 therewithin. The central opening 123 and shaft 124 are correspondingly conically tapered at their leftward ends to form a relatively large area pair of conical mulling surfaces 126 and 127, respectively, substantially as in the aforementioned application Ser. No. 368,085. The leftward end of the central opening 123 communicates with a coaxial ram passage 128. A ram 129 is snugly but slideably reciprocable within the passage 128 by a pressure fluid cylinder 131 affixed to the leftward end of the housing 121. A convenient source of material to be worked, here a hopper 132, is disposed above the leftward end of the ram passage 128 and communicates therewith through a vertical opening 133. Thus, the hopper 132 deposits material to be worked in front of the retracted ram whereafter extension of the ram forces material between and past the mulling surfaces 126 and 127.

An annular passage 134 is formed to the right of the mulling surfaces 126 and 127 by a rearward tapering of the shaft 124. At the rightward end of the annular passage 134, the shaft increases in radius quickly but smoothly to define an annular ridge 136 which separates the annular passage 134 from a similar annular passage 137 on the rightward side of the ridge 136. The passages 134 and 137 correspond generally to the inlet and outlet passages 107 and 106 discussed hereinabove in connection with FIGURE 4 and the ridge 136 corresponds generally to the ridge 103 of the embodiment of FIGURE 4. An outlet opening 138 extends from the rightward end of the annular passage 137 radially outwardly through the wall of the housing 121.

An annular ridge 139 is provided in the central opening 123 which surrounds the ridge 136 for defining a gap 141 therebetween. If desired, the ridge 139 may be provided not on the body of the housing 121 but on an insert thereto so that the shape of the ridge may be varied by changing the insert rather than the entire housing and so that the ridge may be replaced if worn by replacing the insert. In the particular embodiment shown, the insert comprises a plurality, here four, of insert segments 142. The inserts are equally but closely circumferentially spaced, are generally rectangularly shaped and are radially slideable toward and away from the shaft 124 in rectangular channels 143 extending radially outwardly from the central opening 123. Radial set screws 144 are accessible from the outside of the housing 121 and engage the segments 142 for adjusting same radially with respect to the shaft 124 for varying the radial thickness of the gap 141. Removal and installation of the segments 143 may be provided for in any convenient way, here by constructing the housing 121 of end portions 146 and 147 which separate along one side of the channels 143 and which are normally held together by screws 148. A thrust bearing 149 which may be similar to the thrust bearing 48 of FIGURE 3 is preferably disposed between a suitable rightwardly facing shoulder on the shaft 124 and a cover plate 152 secured to the rightward end of the housing 121 by screws 153. A coupling 154 secures the shaft to a suitable rotational motor source, not shown, preferably corresponding to the drive unit 27 of FIGURE 1.

Although the machine 120 of FIGURES 5 and 6 may be used solely for plasticizing or for compounding, it is particularly adapted to operations wherein it is desired to compound or mix several materials, such as plastic granules, a plasticizer, some filler and the like, and in the same machine and machine cycle, frictionally work and plasticize the compounded material to put same in condition for molding, extrusion or the like. In such an operation, materials fed to the large area mulling surfaces 126 and 127 are frictionally worked as disclosed in the aforementioned application Ser. No. 368,085 to soften same and to initiate mixing of the several component materials involved. The partially mixed and partially plasticized material is further mixed in the radially enlarged chamber 123 due to the relative rotation of the shaft and housing and is then forced through the small area mulling gap 141 where, if desired, full plasticizing may be achieved in material thereafter passing through the annular outlet passage 137 and outlet opening 138 to a point of use.

Although use with a conical mulling surface 127 may require the small area mulling surfaces of the ridges 139 and 136 to be run at less than optimum speed, the compromise in the performance thereof may be in certain cases accepted to obtain benefit of a pair of frictional working operations separated by the mixing operation.

Although particular preferred embodiments of the invention have been described hereinabove for purposes of illustration, it will be understood that variations and modifications thereof which lie within the scope of the appended claims are fully contemplated.

What is claimed is:

1. In a machine for plasticizing material, the combination comprising:
   a housing;
   a chamber in said housing having a substantially circular cross section;
   an inlet opening and an outlet opening communicating at axially spaced points through said housing with said chamber;
   an annular radially extending ridge on said housing extending into said chamber between said inlet and outlet openings;
   a rotatable shaft snugly disposed in said chamber and means for rotating said shaft, said shaft having an annular radially extending ridge thereon of maximum radius less than the minimum radius of said ridge one said housing and capable of placement in radial opposition thereto, said ridges defining an annular gap therebetween;
   means defining an annular inlet passage for connecting said inlet opening with one end of said gap and means defining an annular outlet passage for connecting said outlet opening with the other end of said gap;
   means for forcing material to be plasticized into said inlet opening and through said gap to frictionally work same between said ridges as said shaft rotates, and
   means for axially moving said shaft relative to said housing for permitting the ridge on said shaft to be positioned radially opposite the ridge on said housing or on opposite axial sides thereof.

2. In a machine for plasticizing material, the combination comprising:
   a housing;
   a substantially cylindrical chamber in said housing, said chamber having a pair of spaced annular chamber grooves formed in said housing separated by and defining a smooth surfaced radially inwardly extending housing ridge;
   inlet and outlet openings adjacent respective ones of said chamber grooves;
   a rotatable, substantially cylindrical shaft snugly disposed in said chamber and drive means for rotating said shaft, said shaft having a spaced pair of annular shaft grooves and a smooth surfaced outwardly radially extending annular shaft ridge between said shaft grooves, said shaft ridge being of lesser diameter than said housing ridge and being radially alignable therewith for defining a constricted gap therebetween, said constricted gap being of radial thickness substantially less than the radial distance between opposed surfaces of said chamber grooves and said shaft grooves, said shaft being axially movable in at least one direction for separating said ridges and enlarging said gap;
   pressure means for forcing material to be plasticized into said inlet opening through one opposed pair of annular grooves, through said gap, through the other pair of said annular grooves and out the outlet opening, said pressure means and said drive means being independent whereby said pressure means forces material through said gap at a rate independent of the rotational speed of said shaft with said material being frictionally worked within said gap.

3. The machine defined in claim 2 in which the means for axially moving said shaft includes a guide member slidably mounted in said housing, an axial thrust bearing positioned between said guide member and said shaft, and screw means for axially moving the guide member, the thrust bearing and the shaft with respect to said housing.

4. The machine defined in claim 2 including axial passages in said shaft and housing, a source of temperature controlling fluid connected thereto for controlling the temperature of said shaft and housing and further including temperature sensing means in said housing for detecting the temperature thereof.

5. An apparatus for plastification of particulate plastic material, the combination comprising:
 a central member;
 housing means having a chamber therein for receiving said central member;
 means mounting said housing means and said central member for relative rotation therebetween;
 drive means for relatively rotating said housing means and said central member;
 opposed annular radially extending ridges on said member and on said housing means within said chamber, said ridges defining a small gap therebetween;
 means for forcing particulate plastic material through said gap for frictionally working and plasticizing same, said means forcing said material through said gap at a rate which is independent of the relative rotational speed between said housing means and said central member.

6. The machine defined in claim 1, wherein said means forces said material through said gap at a rate which is independent of the rotation of said shaft.

7. In a machine for plasticizing material, the combination comprising:
 a housing;
 a substantially cylindrical chamber in said housing, said chamber having a pair of spaced chamber grooves formed in said housing by and defining a smooth surfaced radially inwardly extending housing ridge;
 inlet and outlet openings adjacent respective ones of said chamber grooves;
 a rotatable, substantially cylindrical shaft snugly disposed in said chamber and drive means for rotating said shaft, said shaft having a spaced pair of annular shaft grooves and a smooth surfaced radially outwardly extending annular shaft ridge between said shaft grooves, said shaft ridge being of lesser diameter than said housing ridge and being radially alignable therewith for defining a constricted gap therebetween, said constricted gap being of radial thickness substantially less than the radial distance between opposed surfaces of said chamber grooves and said shaft grooves, said shaft being axially movable in at least one direction for separating said ridges and enlarging said gap;
 pressure means for forcing material to be plasticized into said inlet opening through one opposed pair of annular grooves, through said gap, through the other pair of said annular grooves and out the outlet opening; and
 means for axially moving said shaft with respect to said housing for permitting the ridge on said shaft to be positioned radially opposite the ridge on said housing or on alternate axial sides thereof.

8. In a machine for mixing and plasticizing material, the combination comprising:
 a housing having an inlet opening and an enlarged chamber therein, said opening being substantially coaxially aligned with said chamber;
 rotatable shaft means mounted in said housing within said chamber, one end of said shaft means being conically tapered and positioned within said chamber in closely spaced relationship with a surrounding seat means on the housing for defining a first material working zone therebetween;
 a first annular ridge on said housing and a second annular ridge on said shaft, said first and second ridges being positioned adjacent but axially spaced from one another within said chamber so as to define an annular gap therebetween, said gap defining a second material working zone axially spaced from said first material working zone;
 means defining a radially enlarged annular passage between said first and second material working zones;
 an outlet opening and means defining a second annular passage separated from said first annular passage by said gap, said second annular passage communicating with said outlet opening and being defined between the surfaces of said shaft and said chamber; and
 means for feeding material under pressure to said inlet opening and through said opening to said first material working zone;
 whereby said material is frictionally worked, softened and mixed as it passes radially outwardly through said first material working zone and thence into and through said second material working zone.

9. The machine defined in claim 8, wherein the ridge mounted on said housing comprises a plurality of circumferentially spaced radial slots formed in said housing and a plurality of insert members positioned within said slots, each of said insert members having a ridge portion formed on one edge thereof, the ridge portions of said plurality of insert members cooperating so as to form a substantially continuous annular ridge, and including means for moving said inserts radially inwardly and outwardly for adjusting the radial width of said gap.

10. The machine defined in claim 8 including a thrust bearing disposed in said housing for opposing axial movement of said shaft away from said inlet opening and means for adjusting the axial position of said shaft for changing the spacing between said conical ends and between said ridges.

References Cited

UNITED STATES PATENTS

| | | | |
|---|---|---|---|
| 2,763,896 | 9/1956 | Vogt | 18—2 X |
| 2,970,341 | 2/1961 | Mallory et al. | 18—12 |
| 2,982,990 | 5/1961 | Zomlefer | 18—2 |
| 3,253,300 | 5/1966 | Gove | 18—2 |

J. SPENCER OVERHOLSER, *Primary Examiner.*

WILBUR L. McBAY, *Assistant Examiner.*